United States Patent
Ribellino et al.

(10) Patent No.: US 6,552,517 B1
(45) Date of Patent: Apr. 22, 2003

(54) SWITCH-TYPE VOLTAGE REGULATOR WITH REDUCTION OF OCCUPIED SPACE FOR SOFT-START FUNCTIONS

(75) Inventors: Calogero Ribellino, Gravina Di Catania (IT); Patrizia Milazzo, Messina (IT)

(73) Assignee: STMicroelectronics S.r.l., Agrate Brianza (IT)

(*) Notice: Subject to any disclaimer, the term of this patent is extended or adjusted under 35 U.S.C. 154(b) by 71 days.

(21) Appl. No.: 09/714,845

(22) Filed: Nov. 15, 2000

(30) Foreign Application Priority Data

Nov. 16, 1999 (IT) .......................... TO99A0995

(51) Int. Cl.[7] ................................. G05F 1/40
(52) U.S. Cl. ....................... 323/282; 323/285
(58) Field of Search ................ 323/268, 271, 323/273, 275, 276, 280, 282, 285; 363/49

(56) References Cited

U.S. PATENT DOCUMENTS

| 4,806,842 A | * | 2/1989 | Bittner | 323/222 |
| 4,823,070 A | * | 4/1989 | Nelson | 323/285 |
| 6,185,082 B1 | * | 2/2001 | Yang | 361/190 |

* cited by examiner

Primary Examiner—Matthew Nguyen
(74) Attorney, Agent, or Firm—Lisa K. Jorgenson; E. Russell Tarleton; SEED IP Law Group PLLC

(57) ABSTRACT

A switch-type regulator with a soft-start function having an output terminal supplying an output voltage, and including an error amplifier, having a first input receiving a constant reference voltage, a second input receiving a feedback voltage dependent on the output voltage, and supplying a compensation terminal with an error voltage correlated to the difference between the reference voltage and the feedback voltage. The error amplifier includes a differential amplifier. The regulator also includes a compensation network connected to the compensation terminal. A soft-start function is obtained exploiting the compensation network.

22 Claims, 3 Drawing Sheets

SWITCH-TYPE VOLTAGE REGULATOR WITH REDUCTION OF OCCUPIED SPACE FOR SOFT-START FUNCTIONS

TECHNICAL FIELD

The present invention relates to a switch-type voltage regulator with reduction of occupied space for internal soft-start functions.

BACKGROUND OF THE INVENTION

As is known, for switch-type voltage regulators, it is necessary to provide integrated circuit elements and external circuit elements which perform the so-called soft-start function, to prevent overloading of some components and causing dangerous output overvoltages during switch-on.

For greater clarity, reference is made to FIG. 1, which shows by way of an example a switch-type regulator 1 of a Buck-type circuit configuration.

In detail, the regulator 1 comprises an integrated circuit 100, which has an input terminal 2 receiving an input voltage $V_{IN}$, an output terminal 3 connected to a load 4 and supplying an output voltage $V_{OUT}$ smaller than the input voltage $V_{IN}$, a compensation terminal 25, and a soft-start terminal 26, supplying a soft-start voltage $V_{SS}$. A compensation resistor 27 and a compensation capacitor 28, connected in series to each other, are coupled between the compensation terminal 25 and ground, whereas a soft-start capacitor 29 is connected between the soft-start terminal 26 and ground.

A DC-DC converter 5 is connected between the input terminal 2 and the output terminal 3 of the integrated circuit 100, and comprises a switch 6 (typically formed by a power transistor, opening and closing whereof is controlled by a driving stage 7), a diode 8, an inductor 10, and a filter capacitor 11.

The regulator 1 also comprises a voltage divider 15, connected between the output terminal 3 and ground, including a first resistor 16 and a second resistor 17, connected to each other at a feedback node 18 supplying a feedback voltage $V_{FB}$, proportional to output voltage $V_{OUT}$.

An error amplifier 20 supplies to an intermediate node 21 an error voltage $V_E$ which is function of the difference between the feedback voltage $V_{FB}$ and a constant reference voltage $V_{REF}$, supplied by a voltage source 22.

The error voltage $V_E$ and a comparison voltage $V_C$, supplied by an oscillator 32 and having a saw-tooth plot with pre-determined frequency, are supplied to the input of a differential-type comparator (PWM—Pulse Width Modulator comparator 30), which in turn generates at the output a driving signal $V_P$, which is supplied to the input of the driving stage 7 of switch 6.

The intermediate node 21 is also directly connected to the compensation terminal 25 and to a soft-start circuit 35, comprising a current source 36, supplying a constant current $I_{SS}$, and an enable transistor 37, for example a bipolar transistor of the PNP type. In particular, an output terminal of the current source 36 is connected to the soft-start terminal 26 and to a base terminal of the enable transistor 37, which also has an emitter terminal connected to the intermediate node 21, and a collector terminal connected to ground.

When the regulator 1 is switched on, all capacitors 11, 28, 29 are discharged, and the feedback voltage VFB is zero. The error amplifier 20 is completely unbalanced, but since the enable transistor 37 is on (in fact it has a base-emitter drop greater than its switching-on voltage), the error voltage $V_E$ of the intermediate node 21 is equal to the soft-start voltage $V_{SS}$ at the soft-start terminal 26, plus the base-emitter voltage of the enable transistor 37. Since the current source 36 charges the soft-start capacitor 29 with the constant current $I_{SS}$, the soft-start voltage $V_{SS}$ and the error voltage $V_E$ increase linearly, until a predetermined threshold is reached, beyond which the enable transistor 37 turns off, and the soft-start circuit 35 switches off.

This prevents overvoltages at the output; in fact, in the absence of the soft-start circuit 35, the error voltage $V_E$ would immediately reach its maximum value, thus giving rise to the maximum possible duty-cycle, and inducing the power switch 6 to support the maximum current, with a risk of an output overvoltage. As an example, FIG. 2a shows a comparison between the plot of the error voltage $V_E$ in a regulator provided with a soft-start circuit (broken line), and the plot of the error voltage $V_E$ in a regulator without a soft-start circuit (dot-and-dash line); on the other hand, the continuous line represents the comparison voltage $V_C$. FIGS. 2b and 2c show the plot of the driving voltage $V_P$ respectively in the case of absence of the soft-start circuit and in presence of the soft-start circuit.

However, the known switch-type regulators have a drawback caused by the need to use components external to the integrated circuit 100 (i.e., the soft-start capacitor 29), specifically in order to provide the soft-start function. This is particularly disadvantageous, since the presence of the relevant pin (soft-start terminal 26) and of the soft-start capacitor 29 involves a significant bulk and an increase in costs, which is particularly detrimental in portable electronic devices, and in particular in power supply for portable PCs.

SUMMARY OF THE INVENTION

The disclosed embodiment of the present invention provides a switch-type regulator with a soft-start function, free from the described disadvantages, and in particular allowing a reduction in the number of external components and pins.

According to the present invention, a switch-type voltage regulator is provided that includes an output terminal supplying an output voltage, a compensation network, and an error amplification circuit, the error amplification circuit having a first input receiving a reference voltage, a second input receiving a feedback voltage correlated to the output voltage, and an output connected to a compensation terminal of the compensation network, the error amplifier circuit supplying an error voltage correlated to the difference between the reference voltage and the feedback voltage, and further comprising a soft start circuit incorporated in the compensation network that is connected to the compensation terminal.

In accordance with another aspect of the invention, a switch-type regulator is provided that includes a converter circuit having a first input coupled to an input node, a second input, and an output coupled to an output node; a comparison voltage source having an output; a differential-type comparator having a first input coupled to the output of the comparison voltage source, a second input, and an output coupled to the second input of the converter circuit; and an error amplifier circuit having an input coupled to the output node to receive a feedback voltage, and an output coupled to the second input of the differential-type comparator, the error amplifier circuit comprising a comparator circuit having a first input coupled to the error amplification circuit input, a second input coupled to a first reference voltage, and an output coupled to the error amplification circuit output, and further including a differential amplifier having a first input coupled to the error amplifier circuit input, a second input coupled to a second reference voltage, and an output coupled to the error amplifier circuit output, the error amplifier circuit further coupled to a compensation circuit input terminal that in turn is coupled to the input node and to the output node, the error amplification circuit configured to supply an error voltage at its output that is correlated to the difference between the first reference voltage and the feedback voltage.

BRIEF DESCRIPTION OF THE DRAWINGS

To assist understanding of the invention, an embodiment is now described, purely by way of non-limiting example, and with reference to the attached drawings, wherein.

DETAILED DESCRIPTION OF THE INVENTION

Figure 1:
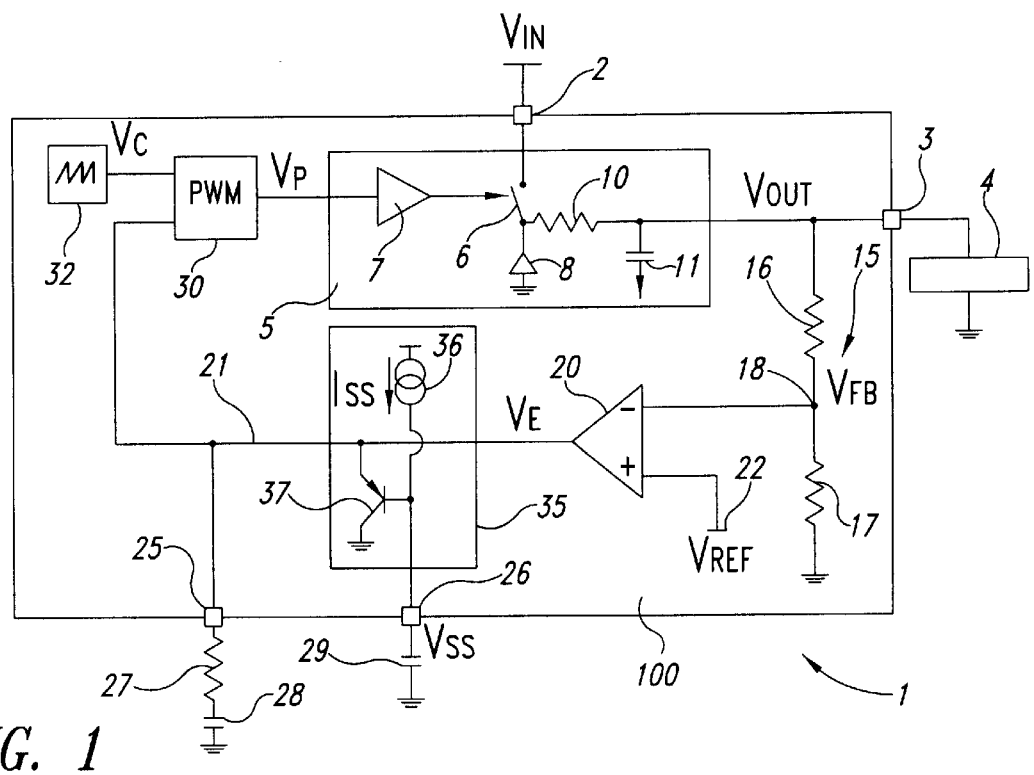
FIG. 1 illustrates a simplified block diagram of a switch-type regulator of a known type.
Figure 3:
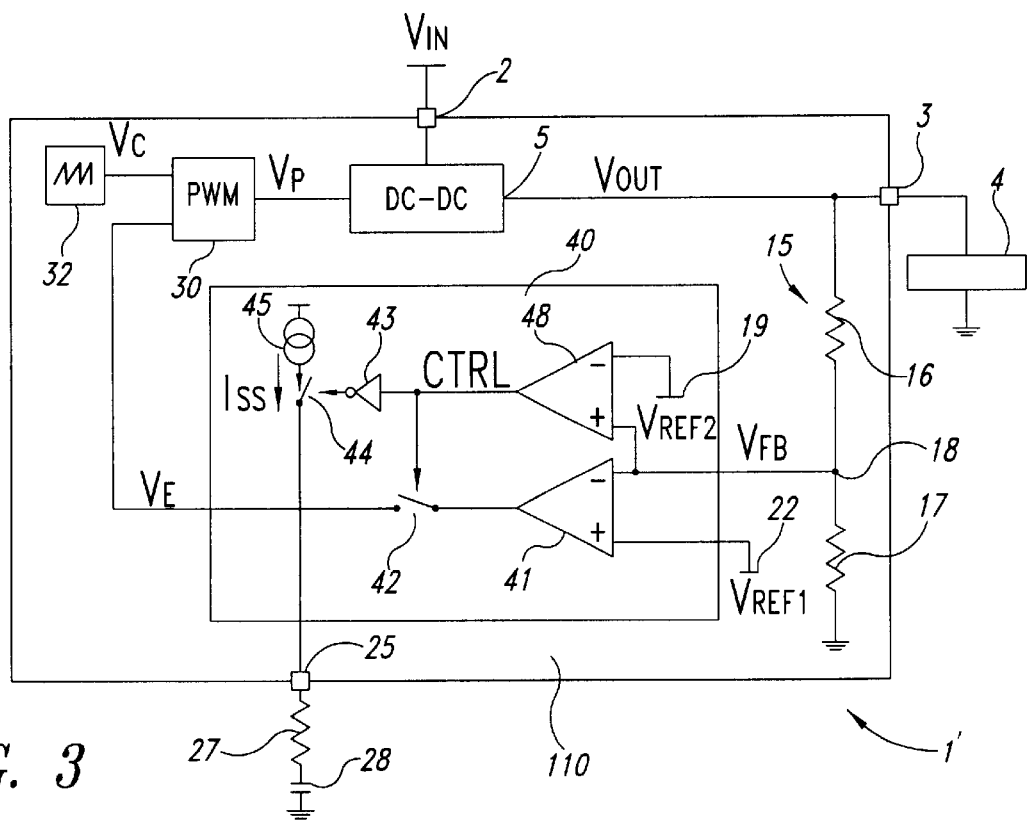
FIG. 3 illustrates a simplified block diagram of a switch-type regulator according to the present invention.
Figure 2A:
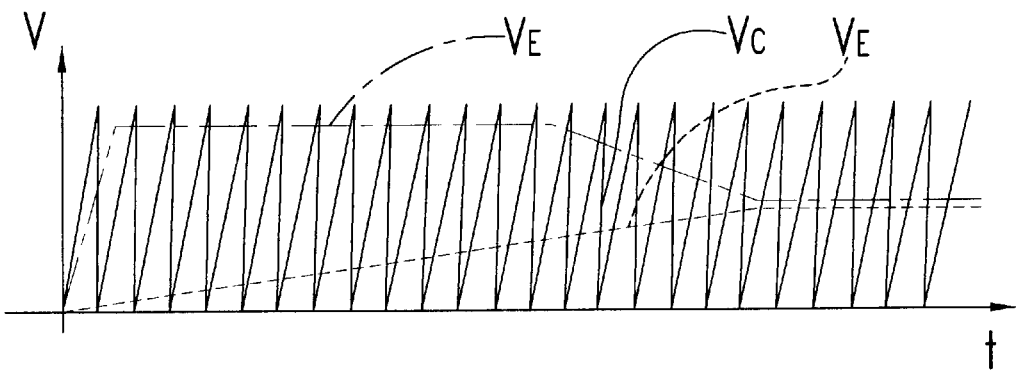
FIGS. 2a to 2c show plots of voltages versus time in known regulators.
Figure 2B:
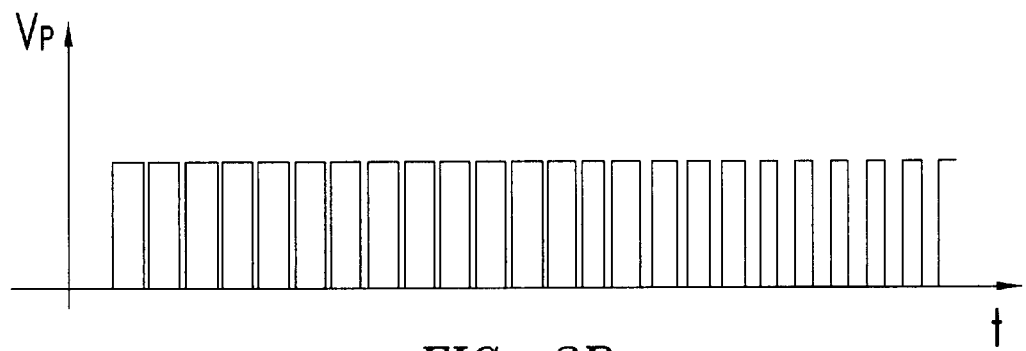
Figure 2C:
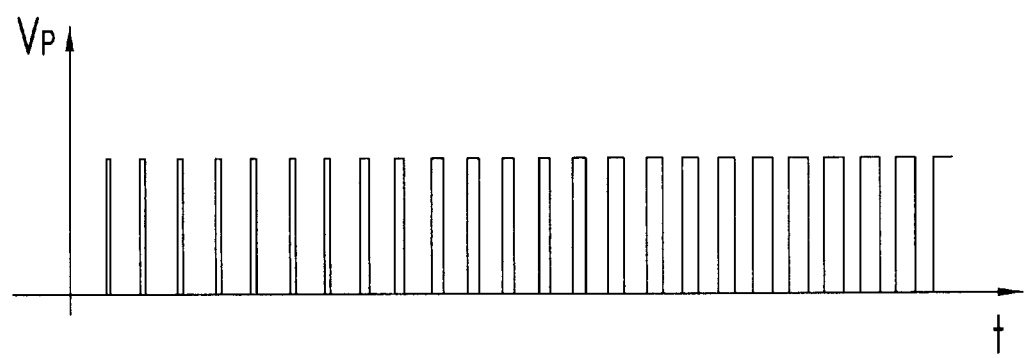

FIG. 3, in which parts similar to those already illustrated with reference to FIG. 1 are designed with the same reference numbers, shows a switch-type regulator 1' with a Buck-type circuit configuration; however, the invention is not limited to this regulator type, but can also be applied to switch-type regulators with different circuit configurations, for example Boost-type, Flyback-type etc.

In detail, the regulator 1' comprises an integrated circuit 110 having an input terminal 2, receiving an input voltage $V_{IN}$, an output terminal 3, connected to a load 4 and supplying an output voltage $V_{OUT}$ smaller than the input voltage $V_{IN}$, and a compensation terminal 25. A compensation resistor 27 and a compensation capacitor 28, connected in series with each other, are connected between the compensation terminal 25 and ground.

A DC-DC converter 5, having the structure shown in FIG. 1, is connected between the input terminal 2 and the output terminal 3 of the integrated circuit 100.

The regulator 1' also comprises a voltage divider 15 connected between the output terminal 3 and ground and formed by a first resistor 16 and a second resistor 17, which are connected to each other at a feedback node 18 supplying a feedback voltage $V_{FB}$ proportional to the output voltage $V_{OUT}$.

The feedback node 18 is connected to an inverting input of an error amplifier 40, described in detail hereinafter, and has a non-inverting input, receiving a first, constant reference voltage $V_{REF1}$, supplied by a first voltage source 22, and an output connected to the compensation terminal 25, and supplying an error voltage $V_E$.

The error voltage $V_E$ and a comparison voltage $V_C$, fed by an oscillator 32 and having sawtooth shape with a predetermined frequency, are supplied at the input of a PWM comparator 30, which generates at the output a driving signal $V_P$, supplied to the input of the DC-DC converter 5.

As shown in FIG. 3, the error amplifier 40 comprises a differential amplifier 41, receiving the reference voltage $V_{REF1}$ at an own non-inverting input and the feedback voltage $V_{FB}$ at an own inverting input. In addition, the differential amplifier 41 has an output connected to the compensation terminal 25, via a first switch 42, and supplying an output voltage which is a function of the difference between the reference voltage $V_{REF1}$ and feedback voltage $V_{FB}$.

The error amplifier 40 additionally comprises a comparator 48, which, at its inverting and non-inverting inputs, receives respectively a second reference voltage $V_{REF2}$ and the feedback voltage $V_{FB}$, and generates at the output a control signal CTRL switching between two values. In particular, the second reference voltage $V_{REF2}$, generated by a second voltage source 19, is close to the first reference voltage $V_{REF1}$ (for example, is equal to the first reference voltage $V_{REF1}$, minus 0.1 V) and the control signal CTRL has a first value when the feedback voltage $V_{FB}$ is smaller than the second reference voltage $V_{REF2}$, and otherwise it has a second value.

The control signal CTRL controls opening and closing of the first switch 42, and, via an inverter 43, it controls a second switch 44, arranged between the compensation terminal 25 and a soft-start current source 45, which supplies a constant soft-start current $I_{SS}$. In detail, when the control signal CTRL has the first value, the first switch 42 is open, whereas the second switch 44 is closed; on the other hand, when the control signal CTRL has the second value, the first switch 42 is closed, such that the error voltage $V_E$ at the compensation terminal 25 is equal to the output voltage of the differential amplifier 41 and the second switch 44 is open.

The regulator 1' in FIG. 3 functions as follows. When it is switched on, the output voltage $V_{OUT}$, the feedback voltage $V_{FB}$, and the error voltage $V_E$ are zero. In addition, the compensation capacitor 28 is discharged.

Since the feedback voltage $V_{FB}$ is smaller than the second reference voltage $V_{REF2}$, the control signal CTRL has the first value, thus the first switch 42 is open and the second switch 44 is closed. In this condition, the soft-start function is enabled. In particular, the soft-start current source 45 charges the compensation capacitor 28 with the constant soft-start current $I_{SS}$, and the error voltage $V_E$ of the compensation terminal 25 increases linearly over a period of time. Consequently, the output voltage $V_{OUT}$ and the feedback voltage $V_{FB}$ increase gradually. When the feedback voltage $V_{FB}$ exceeds the second reference voltage $V_{REF2}$, the control signal CTRL switches to the second value, and causes the first switch 42 to close and the second switch 44 to open, thus excluding the soft-start function. Consequently, the regulator switches into the standard regulation condition, wherein the error voltage $V_E$ of the compensation terminal 25 is correlated to the difference between the feedback voltage $V_{FB}$ and the first reference voltage $V_{REF1}$.

Figure 4:
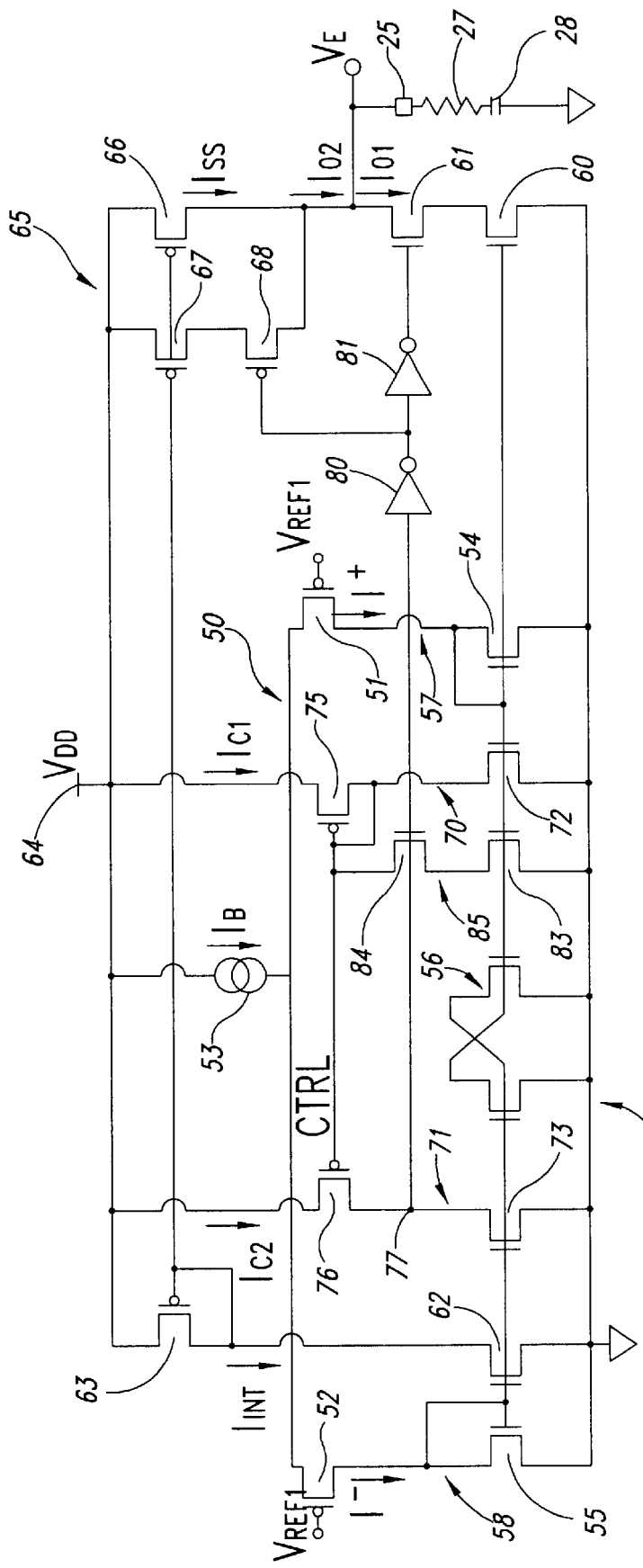
FIG. 4 shows a circuit diagram of part of the switch-type regulator in FIG. 3.

As shown in FIG. 4, the error amplifier 40 comprises a differential stage 50 including a first input transistor 51 and a second input transistor 52, both of PMOS type. A gate terminal of the first transistor 51 forms the non-inverting input of the differential amplifier 41, thus it is connected to the voltage source 22, not shown here, and receives the reference voltage $V_{REF}$. A gate terminal of the second input transistor 52, connected to the feedback node 18 and receiving the feedback voltage $V_{FB}$, forms the inverting input of the differential amplifier 41. The first and second input transistors 51, 52 have source terminals connected to each other and to a biasing current source 53, thus supplying a constant biasing current $I_B$, and drain terminals connected in a known manner respectively to a first and a second load transistor 54, 55, both of diode-connected NMOS transistors. The drain terminals of the input transistors 51, 52 are also connected to a gain stage 56 formed in a known manner by two NMOS transistors. The first input transistor 51 and the first load transistor 54 form a non-inverting branch 57 of the differential amplifier 50, passed by a first differential current $I^+$, whereas the second input transistor 52 and the second load transistor 55 form an inverting branch 58 of the differential amplifier 50, carrying a second differential current $I^-$; in addition, the sum of the first and second differential currents $I^+$, $I^-$ is always equal to the biasing current $I_B$.

The first load transistor 54 forms a current mirror circuit with a first output transistor 60 of NMOS type, which has a grounded source terminal and a drain terminal connected to the compensation terminal 25, via a first switching transistor 61 of NMOS type. The first output transistor 60 generates a first output current $I_{O1}$, amplified with respect to the first differential current $I^+$ flowing in the first load transistor 54, according to a ratio of 1:N equal to the form factor ratio W/L of transistors 54, 60.

The second load transistor 55 forms a current mirror circuit of unitary ratio with a first intermediate transistor 62 of NMOS type. The first intermediate transistor 62 has a drain terminal connected to the drain terminal of a second, intermediate transistor 63, of PMOS type and diode-connected, and has a source terminal connected to a supply line 64. Thereby, a current $I_{INT}$, equal to the second differential current $I^-$, flows in the first and in the second intermediate transistors 62, 63.

In turn, the second intermediate transistor 63 forms a current mirror circuit with a second output transistor 65 of PMOS type. The second output transistor 65 supplies a second output current $I_{O2}$, which is amplified with respect to the current $I_{INT}$, and thus to the second differential current $I^-$, according to a mirror ratio of 1:N, which is equal to that of the transistors 54, 60. In addition, the second output transistor 65 is subdivided into a soft-start transistor 66 and a complement transistor 67, which have common source terminals connected to the supply line 64, common gate terminals connected to the gate terminal of the second intermediate transistor 63, and drain terminals connected to the compensation terminals 25, respectively directly, and via a second switching transistor 68. The soft-start transistor 66 and the complement transistor 67 have shape factors such as to conduct complementary fractions of the second output current $I_{O2}$. For example, the soft-start transistor 66 conducts a current of $0.01*I_{O2}$, and the complement transistor 67 conducts a current of $0.99*I_{O2}$.

In practice, the non-inverting branch 57, the inverting branch 58, the first and the second intermediate transistors 62, 63, and the first and second output transistors 60, 65 form the differential amplifier 41, and the first switching transistor 61 forms the first switch 42.

A first and a second control branch 70, 71 comprise respectively a first and a second control transistor 72, 73 of NMOS type. The first control transistor 72 has a gate terminal connected to a gate terminal of the first load transistor 54, a source terminal connected to ground, and a drain terminal connected to a drain terminal of a third control transistor 75, of PMOS type and diode-connected, and has a source terminal connected to the supply line 64. The second control transistor 73 has a grounded source terminal, a gate terminal connected to a gate terminal of the second load transistor 55, and a drain terminal connected to a control node 77. The control node 77 is also connected to a drain terminal of a fourth control transistor 76, of PMOS type, which forms a current mirror circuit with the third control transistor 75.

The voltage at the control node 77 defines the control signal CTRL, and is supplied to the gate terminals of the first and the second switching transistors 61, 68. In particular, the gate terminal of the first switching transistor 61 is connected to the control node 77 via a second and a third inverter 80, 81 which are connected in series to each other, whereas the second switching transistor 68 has a gate terminal connected to the intermediate node, between the second inverter 80 and the third inverter 81.

A first thrust transistor 83, of NMOS type, has a gate terminal connected to the gate terminal of the first load transistor 54, a grounded source terminal, and a drain terminal connected to a source terminal of a second thrust transistor 84, which is also of NMOS type and has a gate terminal connected to the control node 77 and a drain terminal connected to gate terminals of the third and fourth control transistors 75, 76. The thrust transistors 83, 84 define a thrust branch 85.

In practice, the first and second control branches 70, 71, and the first and second thrust transistors 83, 84 form comparator 48.

The regulator 1' in FIG. 4 functions as follows.

At switching on, the feedback voltage $V_{FB}$ is zero; thus, the differential stage 50 is completely unbalanced, the first differential current $I^+$ flowing in the non-inverting branch 57 is zero, and the second differential current $I^-$ is equal to the biasing current $I_B$. Consequently, the first control transistor 72 is switched off, and the second control transistor 73 is switched on, and carries all the biasing current. The second control transistor 73 thus has a negligible drain-source voltage drop, and the control node 77 is at a voltage value close to 0 V, which represents the first value of the control signal CTRL. In this condition, the first and second switching transistors 61, 68 are off, and the first output transistor 60 and the complement transistor 67 cannot conduct current. On the other hand, the soft-start transistor 66 is biased in the on condition by the first and second intermediate transistors 62, 63, and thus operates as the soft-start current source 45, supplying the compensation capacitor 28 with the constant soft-start current Iss. The value of the soft-start current $I_{SS}$ can be selected in a known manner, on the basis of the values of the biasing current $I_B$, the mirror ratio of 1:N, and the ratio between the shape factors of transistors 66, 67.

The compensation capacitor 28 then begins to be charged, and, as previously stated, the error voltage $V_E$ of the compensation terminal 25 increases linearly, making the output voltage $V_{OUT}$ and the feedback voltage $V_{FB}$ also increase. Thereby, during switching-on, when the compensation function is not necessary, the soft-start transistor 66 and the compensation capacitor 28 carry out the soft-start function.

When the feedback voltage $V_{FB}$ increases, the differential stage 50 begins to be balanced, and thus the first differential current $I^+$ begins to flow in the non-inverting branch 57, with an increasing value; consequently, the first control transistor 72 also switches on. The first control branch 70 is flown by a first increasing control current $I_{C1}$, mirrored via the third and fourth control transistors 75, 76. Thereby, the second control branch 71 is flown by a second control current $I_{C2}$ equal to the first control current $I_{C1}$, and the voltage at the control node 77 (amplitude of the control signal CTRL) increases, but its value is not sufficient to switch on the second thrust transistor 84.

When the feedback voltage $V_{FB}$ is close to the first reference voltage $V_{REF1}$ (i.e., with reference to FIG. 3, when it reaches the second reference voltage $V_{REF2}$), the voltage at the control node 77 (control signal CTRL) is such as to switch on the second thrust transistor 84. Since the first thrust transistor 83 is in a switched-on condition from the moment when the first load transistor 54 begins to conduct, the thrust branch 85 begins to conduct current. This therefore triggers a positive feedback, wherein conduction of the first and second thrust transistors 83, 84 causes a rapid decrease in the voltage at the gate terminals of the third and fourth control transistors 75, 76, a rapid increase in the first and second control currents $I_{C1}$, $I_{C2}$, and consequently a sudden increase in the voltage at the control node 77, to a value close to the supply voltage $V_{DD}$ on the supply line 64. Thereby, the control signal CTRL switches quickly from the first to the second value, and the first inverter 80 is prevented from entering the so-called cross-conduction condition. The value of the feedback voltage $V_{FB}$ at which the control signal CTRL switches (second reference voltage $V_{REF2}$) can be selected according to design requirements, and set, in a known manner, by suitably sizing the first and second thrust transistors 83, 84.

When the control signal CTRL switches to the second value, the first and second switching transistors 61, 68 switch on, thus allowing the passage of current through the first output transistor 60 and the complement transistor 67. Thereby, both the soft-start transistor 66 and the complement transistor 67 contribute towards forming the second output current $I_{O2}$ supplied by the second output transistor 65, and in practice the soft-start function is disabled.

The advantages of the present invention are apparent from the foregoing description. In particular, the fact of using the compensation capacitor 28 also to carry out the soft-start function makes it possible to avoid the use of a component connected outside the integrated circuit 110, i.e., the soft-start capacitor 29 in FIG. 1, and the relevant pin. This allows a considerable reduction in costs and space occupied by the switch-type regulator.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

What is claimed is:

1. A switch-type regulator, comprising an output terminal supplying an output voltage; error amplifier means; a compensation network; and soft-start means;
    said error amplifier means comprising a different amplifier means and having a first input receiving a reference voltage, a second input receiving a feedback voltage correlated to said output voltage, and an output connected to a compensation terminal, said error amplifier means supplying an error voltage correlated to the difference between said reference voltage and feedback voltage;
    said compensation network being connected to said compensation terminal and said soft-start means includes said compensation network, said soft-start means comprise current generator means connected to said compensation terminal, and a control circuit connected to said current generator means and to said differential amplifier means, thereby selectively enabling said current generator means and said differential amplifier means.

2. The switch-type regulator of claim 1, wherein said compensation terminal is connected to said current generator means when said feedback voltage is lower than a predetermined voltage value and to said differential amplifier means, when said feedback voltage is greater than said predetermined voltage value.

3. The switch-type regulator of claim 1, wherein said current generator means is a constant current generator means.

4. The switch-type regulator of claim 1, wherein said control circuit comprises comparator means receiving said predetermined voltage value, and said feedback voltage and supplying a control signal.

5. The switch-type regulator of claim 4, wherein said control circuit comprises first and second switch means controlled by said control signal in phase opposition.

6. The switch-type regulator of claim 5, wherein said first switch means is coupled between said differential amplifier means and said compensation terminal, and the second switch means is coupled between said second current generator means and said compensation terminal.

7. The switch-type regulator of claim 1, wherein said soft-start means comprises current generator means and a control circuit, said current generator means comprising first and second output transistor means connected in parallel to each other and to said compensation terminal, and said control circuit being connected to said current generator means, and selectively enabling one and both of said first and second output transistor means.

8. The switch-type regulator of claim 7, further comprising a switch coupled between said second output transistor means and said compensation terminal and having a control terminal, said control circuit being connected to said control terminal of said switch, thereby opening said switch when said feedback voltage is lower than said predetermined voltage value and closing said switch when said feedback voltage is greater than said predetermined voltage value.

9. The regulator of claim 7, wherein said error amplifier means comprises an error amplifier having a non-inverting branch and an inverting branch, and said control circuit comprises a first and a second control branch connected respectively to said non-inverting branch and to said inverting branch in respective current ratios, said second control branch defining a control node connected to said control terminal of said switch.

10. The regulator of claim 9, wherein said control circuit comprises a thrust branch connected to said non-inverting branch of said error amplifier means to conduct correlated currents; the thrust branch being coupled to and quickly actuating said second control branch, and generates a switching-on signal for said switch, when said feedback voltage is close to said reference voltage.

11. A voltage regulator circuit, comprising:
    a converter circuit having a first input coupled to an input node, a second input, and an output coupled to an output node;
    a comparison voltage generator having an output;
    a differential-type comparator having a first input coupled to the output of the comparison voltage generator, a second input, and an output coupled to the second input of the converter circuit; and
    an error amplification circuit having an input coupled to the output node to receive a feedback voltage, and an output coupled to the second input of the differential-type comparator, the error amplification circuit further comprising a comparison circuit having a first input coupled to the error amplification circuit input, a second input coupled to a first reference voltage, and an output coupled to the error amplification circuit output, and a differential amplifier having a first input coupled to the error amplification circuit input, a second input coupled to a second reference voltage, and an output coupled to the error amplification circuit output, the error amplification circuit further coupled to a compensation circuit input terminal that in turn is coupled to the input node and to the output node, the error amplification circuit configured to supply an error voltage at its output that is correlated to the difference between the first reference voltage and the feedback voltage.

12. The circuit of claim 11, wherein the comparison circuit is coupled to the error amplification circuit output and the compensation circuit input terminal via a first switch having a control terminal coupled to the output of the differential amplifier.

13. The circuit of claim 12, further comprising a current source having an output coupled to the error amplification circuit output and to the compensation circuit input terminal via a second switch having a control terminal coupled to the output of the differential amplifier.

14. The circuit of claim 13, further comprising an inverter coupled between the output of the differential amplifier and the control terminal of the second switch.

15. The circuit of claim 14, wherein the first and second switches comprise transistors.

16. The circuit of claim 11, wherein the differential-type comparator comprises a pulse-width modulation circuit.

17. The circuit of claim 13, wherein the comparison circuit comprises first and second control branches, each branch comprising respectively a first and a second control transistor, each transistor having a grounded source terminal, the first transistor having a drain terminal connected to a drain terminal of a third control transistor, the second control transistor having a drain terminal connected to a control node, and further comprising first and second thrust transistors, the first thrust transistor having a grounded source terminal and a drain terminal connected to a source terminal of the second thrust transistor.

18. A switch-type regulator, comprising an output terminal supplying an output voltage; error amplifier means; a compensation network; and soft-start means;

said error amplifier means comprising a different amplifier means and having a first input receiving a reference voltage, a second input receiving a feedback voltage correlated to said output voltage, and an output connected to a compensation terminal, said error amplifier means supplying an error voltage correlated to the difference between said reference voltage and feedback voltage;

said compensation network being connected to said compensation terminal and comprising a capacitor and said soft-start means includes said compensation network, with said capacitor performing a soft-start capacitor function during a first operational state and a compensation-capacitor function during a second operational state.

19. The switch-type regulator of claim 18, wherein said error amplifier means includes differential amplifier means, and said soft-start means comprise current generator means connected to said compensation terminal, and a control circuit connected to said current generator means and to said differential amplifier means, thereby selectively enabling said current generator means and said differential amplifier means.

20. The switch-type regulator of claim 19, wherein said compensation terminal is connected to said current generator means when said feedback voltage is lower than a predetermined voltage value and to said differential amplifier means, when said feedback voltage is greater than said predetermined voltage value.

21. The switch-type regulator of claim 19, wherein said current generator means is a constant current generator means.

22. The switch-type regulator of claim 19, wherein said control circuit comprises comparator means receiving said predetermined voltage value, and said feedback voltage and supplying a control signal.

* * * * *

UNITED STATES PATENT AND TRADEMARK OFFICE
CERTIFICATE OF CORRECTION

PATENT NO. : 6,552,517 B1  Page 1 of 1
APPLICATION NO. : 09/714845
DATED : April 22, 2003
INVENTOR(S) : Calogero Ribellino et al.

It is certified that error appears in the above-identified patent and that said Letters Patent is hereby corrected as shown below:

Column 7
Claim 1, Line 51, "different" should read as --differential--.

Column 10
Claim 18, Line 4, "different" should read as --differential--.

Signed and Sealed this

Twenty-fifth Day of March, 2008

JON W. DUDAS
*Director of the United States Patent and Trademark Office*